United States Patent [19]

Veltum et al.

[11] Patent Number: 5,572,017
[45] Date of Patent: Nov. 5, 1996

[54] PRECIPITATION-DETECTING OPTOELECTRONIC SENSOR

[75] Inventors: Christian Veltum, Iserlohn; Ralf Böbel, Dortmund, both of Germany

[73] Assignee: Leopold Kostal GmbH & Co. KG, Ludenscheid, Germany

[21] Appl. No.: 352,500

[22] Filed: Dec. 9, 1994

[51] Int. Cl.$^6$ ..................................................... G02B 6/42
[52] U.S. Cl. .................. 250/227.25; 250/574; 318/483
[58] Field of Search ........................ 250/227.24, 227.25, 250/574; 318/483; 356/445, 135, 136; 340/602

[56] References Cited

U.S. PATENT DOCUMENTS

| 4,652,745 | 3/1987 | Zabardelli | 250/227.25 |
| 5,262,640 | 11/1993 | Purvis et al. | 250/227.25 |
| 5,391,891 | 2/1995 | Wiegleb et al. | 250/574 |
| 5,414,257 | 5/1995 | Stanton | 250/227.25 |

FOREIGN PATENT DOCUMENTS

| 3314770 | 11/1987 | Germany. |
| 4006174 | 7/1991 | Germany. |

Primary Examiner—Edward P. Westin
Assistant Examiner—Stephen Calogero
Attorney, Agent, or Firm—Brooks & Kushman PC

[57] ABSTRACT

An optoelectronic sensor device includes a waveguide element for affixing to a transparent pane on one surface and connected to a housing by way of latching barbs provided on U-shaped arms which engage corresponding recesses in the waveguide element. Slide-like locking elements are guided by the housing, parallel to the waveguide element and the pane, into the spaces defined by the U-shaped arms to prevent the arms from disengaging their respective recesses. The locking elements are adjustable by way of a handle which is flush with the housing when the latching elements are in their locked position. The locking elements include dome-shaped protrusions which cooperate with an edge of the housing to secure the locking elements within the housing.

10 Claims, 1 Drawing Sheet

PRECIPITATION-DETECTING OPTOELECTRONIC SENSOR

TECHNICAL FIELD

The present invention relates to an optoelectronic sensor device designed for detecting the degree of wetness of a transparent window pane, by, for example, natural precipitation.

BACKGROUND ART

The purpose of such an optoelectronic sensor device is to detect the quantity of moisture precipitating per unit of time on the front or rear windshield of a motor vehicle. This information is used to automatically control a windshield wiper system associated with the transparent pane.

A device for controlling a motor-driven windshield wiper system is disclosed in German Patent No. DE 33 14 770 Cl, in which a waveguide element is attached to the inner surface of a transparent pane to guide a beam emitted from an associated beam transmitter. The beam is coupled into the transparent pane, and after at least one reflection at the outer surface of the pane, is decoupled from the waveguide element and directed to an associated beam receiver. The waveguide element, the beam transmitter, and the beam receiver are disposed within a protective housing to assure an accurate measurement.

This type of waveguide element, including at least one beam transmitter and at least one beam receiver disposed within a housing, is disclosed in German Patent No. DE 40 06 174 Cl. The housing described in that patent has clip means including latching arms with associated latching cams (barbs) disposed at the base part of the housing which engage latching recesses of the waveguide element to secure the housing thereto. Due to the considerable mass of the components connected to the waveguide element by way of the clip means, and the relatively large forces occurring in a motor vehicle as a result of, for example, acceleration, the housing components may loosen such that they disengage the waveguide element.

SUMMARY OF THE INVENTION

An object of the present invention is, therefore, to further develop an optoelectronic sensor device such that the components associated with the waveguide element are reliably attached thereto.

This object is achieved according to the present invention by providing a locking element which prevents disengagement of the latching arms from the housing.

One advantage of this type of device is that the manner in which the latching arms are locked into place is extremely compact requiring only a relatively small amount of space and minimum additional cost.

For a sensor device designed according to the present invention, it is advantageous if the housing surrounding the waveguide element is designed in two parts and the means for securely attaching the housing to the waveguide element is provided at the base part of the housing.

In carrying out the above object and other objects and features of the present invention, an optoelectronic sensor device for detecting precipitation on an outer surface of a transparent pane includes a waveguide element fixed to an inner surface of the pane, the waveguide element including at least one measuring distance extending between a beam transmitter and a beam receiver and also including latching recesses on opposite side walls. A housing surrounds the waveguide element, the beam transmitter, and the beam receiver and is secured to the waveguide element via latching arms provided at opposite side regions of the housing which engage the corresponding recesses on the waveguide element. Latching cams (barbs) associated with the latching arms are provided to securely hold the latching arms into cooperating engagement with the latching recesses. In addition, a plurality of locking elements, which are movably guided by the housing parallel to the transparent pane and adjustable by means of a handle, are provided to prevent an associated latching cam from sliding out of its associated recess. In one embodiment, the housing includes a base part in contact with the inner surface of the pane and a cover part with the latching arms and the locking elements being provided at the base part of the housing.

Further advantageous constructions of a device according to the present invention are described in grater detail with reference to one embodiment of a sensor device constructed accordingly and illustrated in the accompanying drawings.

BEST MODE FOR CARRYING OUT THE INVENTION

Figure 1:
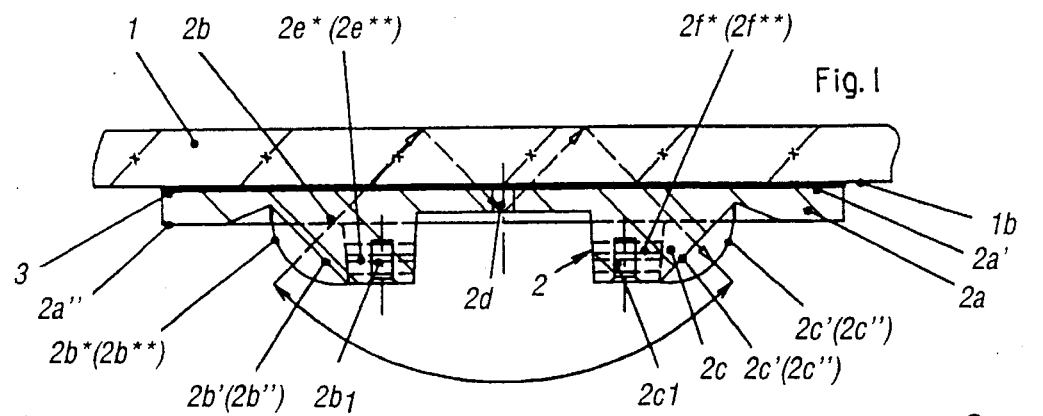
FIG. 1 is a longitudinal sectional view through the waveguide element which is secured to a transparent pane and which is coupled to a sensor device as shown in FIGS. 2 and 3.

As the drawings illustrate, an optoelectronic sensor device for detecting the degree of wetness caused by, e.g. drop-shaped natural precipitation, of a transparent, preferably glass, pane 1 comprises a waveguide element 2 which is attached to inner surface 1b of transparent pane 1, where the inner surface 1b is not exposed to the precipitation. Waveguide element 2 is attached by means of an adhesive layer 3 which is permeable, for example, to infrared beams.

In one embodiment, transparent pane 1 is the windshield of a motor vehicle. The sensor device is disposed at a point which does not impair vision but is selected for detecting the precipitation. Preferably, the sensor device is disposed in a substantially two-part housing 4. The waveguide element 2 includes a flat base region 2a and a beam entry region 2b associated with beam transmitters 5*,5** as well as a beam exit region 2c associated with beam receivers 6*,6**. The beam receivers 6*,6** are provided on surface 2a" of base region 2a remote from transparent pane 1. Beam entry region 2b and beam exit region 2c are provided with two beam windows 2b', 2b"; 2c', 2c" which are associated with the beam transmitters and beam receivers, respectively, by way of an associated beam lens 2b*, 2b**; 2c*, 2c** respectively. The beam windows are aligned at an angle of approximately 45° with respect to surface 2a" of base region 2a. The beam windows are disposed at beam entry region 2b and beam exit region 2c such that their centerlines are offset with respect to each other by an angle of approximately 90°.

In order to ensure that the measurement result is not influenced by beams which are not directly associated with the measuring distance, waveguide element 2 is almost completely covered with a protective layer (not illustrated for the sake of simplicity). The protective layer is preferably on surface $2a''$ of base region $2a$ remote from transparent pane 1 and also on the associated surfaces of beam entry region $2b$ in addition to beam exit region $2c$. A surface portion without the protective layer is provided for the passage of the beams therethrough in the manner described. More specifically, the protective layer consists of a reflective and/or absorbent material which covers the surfaces of waveguide element 2 remote from transparent pane 1 with the exception of surface portions associated with beam lenses $2b^*$, $2b^{**}$; $2c^*$, and $2c^{**}$.

As is known, it is possible to increase the measuring area to be scanned on the pane by creating a multi-reflection of the beams in the region of pane 1 (FIG. 1). To accomplish this, the protective layer, provided on surface $2a''$ of base region $2a$ in the portion lying between beam entry region $2b$ and beam exit region $2c$, is formed as a reflective layer. To ensure that this reflective layer adheres well to the relevant surface of waveguide element 2, the layer is produced from a material which has an expansion factor almost identical to that of the material of waveguide element 2.

Waveguide element 2 is treated appropriately, at least with respect to its surface, to prevent beams of different wavelengths from entering waveguide element 2 in addition to beams of a predetermined wavelength, such as, for example, infrared beams.

Beam windows $2b'$, $2b''$ (FIG. 1) and the associated beam lenses $2b^*$, $2b^{**}$ of beam entry region $2b$, as well as beam windows $2c'$, $2c''$ and the associated beam lenses $2c^*$, $2c^{**}$ of beam exit region $2c$, are disposed partially within a recess provided in surface $2a''$ of base region $2a$. The recess preferably has a wedge-shaped progression. This minimizes measurements dependent upon the beam path as determined by the natural laws of optical science and the length and height of waveguide element 2. Consequently, the value of the measurement is also minimized due to the minimized amount of associated insulation. This is important for the required transmission output as well as the measurement result.

Beam windows $2b'$, $2b''$ and $2c'$, $2c''$ along with associated beam lenses $2b^*$, $2b^{**}$ and $2c^*$, $2c^{**}$, respectively, are each allocated to a respective associated recess in such a manner that a point on the periphery thereof is tangential to the respective deepest portion of the respective recess. The deepest portion of the recess is located in the central material region of base region $2a$ in such a manner so as not to impair the mechanical stability thereof.

To attach waveguide element 2 to transparent pane 1, it is preferable to use a material which is similar to the material of transparent pane 1, or which at least has an expansion characteristic which is substantially similar to that of transparent pane 1. An optically transparent adhesive layer 3 is used for the attachment. Adhesive layer 3 is applied, for example, as a liquid adhesive by means of an injection device through an opening $2d$ provided in a preferably rotationally symmetrical manner in the center of base region $2a$. Base region $2a$ of waveguide element 2 is flat with an ellipse-like contour, extending substantially parallel to the contour of the pane. Due to this arrangement, the adhesive initially spreads out uniformly between inner surface $1b$ of pane 1 and surface $2a'$ of base region $2a$, but slows down when arriving at the edge of base region $2a$ (which first occurs in proximity of the ends of the major axis of the ellipse) and subsequently spreads out only in the direction of the major axis of the ellipse due to the holding forces, i.e. surface tension of the adhesive, etc. Precise metering of the adhesive allows the surface regions of pane 1 and waveguide element 2 to be completely moistened without substantial portions of adhesive penetrating beyond these regions and without varying the thickness of the adhesive layer to a degree which would influence the measurement result.

Figure 3:
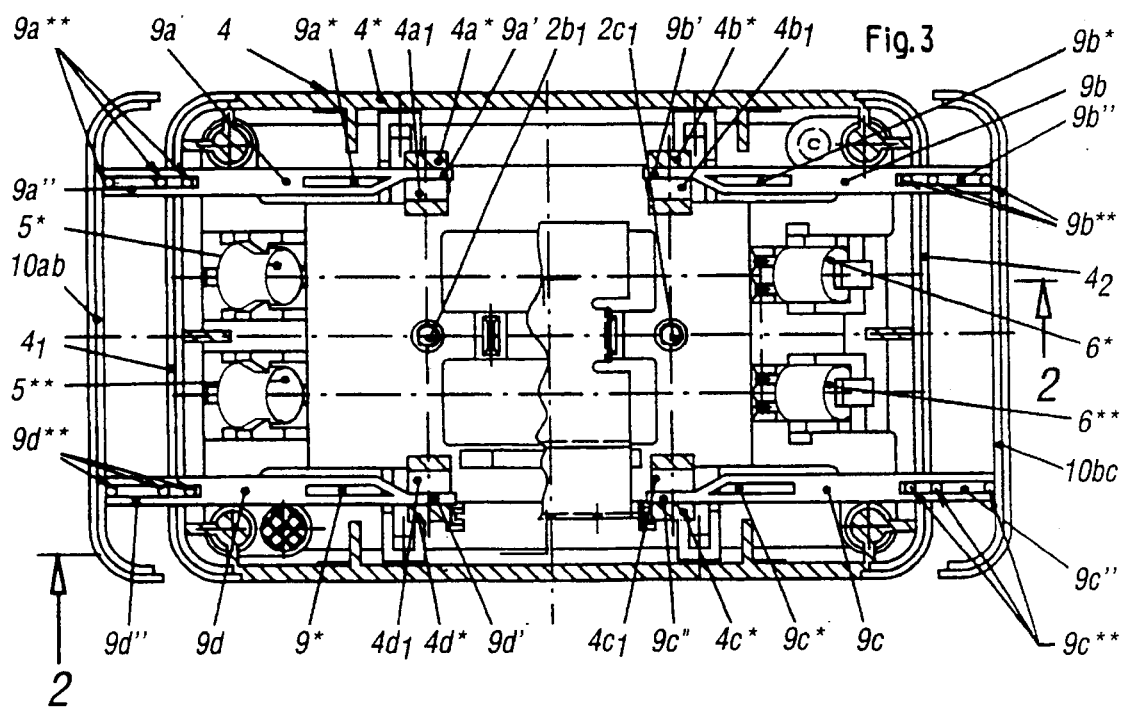
FIG. 3 is a cross-sectional view of the sensor device without the waveguide element taken along line A-B of FIG. 2.

In order to accurately couple beam transmitters $5^*$, $5^{**}$ and beam receivers $6^*$, $6^{**}$ to the associated beam window and beam lens, which is very important for an accurate measurement, waveguide element 2 is provided with retaining means which cooperate with attachment means provided on a component carrier 7. Beam transmitters $5^*$, $5^{**}$ (FIG. 3) and beam receivers $6^*$, $6^{**}$ are also held in corresponding alignment within the component carrier to a printed circuit board 8 with electrical components disposed thereon, including a heating device. The retaining means are formed on the one side from recesses $2b_1$, $2c_1$ which are provided in the top surfaces of beam entry region $2b$ and beam exit region $2c$. Recesses $2b_1$ and $2c_1$ are preferably rotationally symmetrical and are provided for precisely fixing component carrier 7 in the X and Y directions. The retaining means also include notches (not specifically illustrated for the sake of simplicity) positioned in two opposite sidewalls of beam entry region $2b$ and beam exit region $2c$ which are provided for fixing component carrier 7 in the Z direction.

Figure 2:
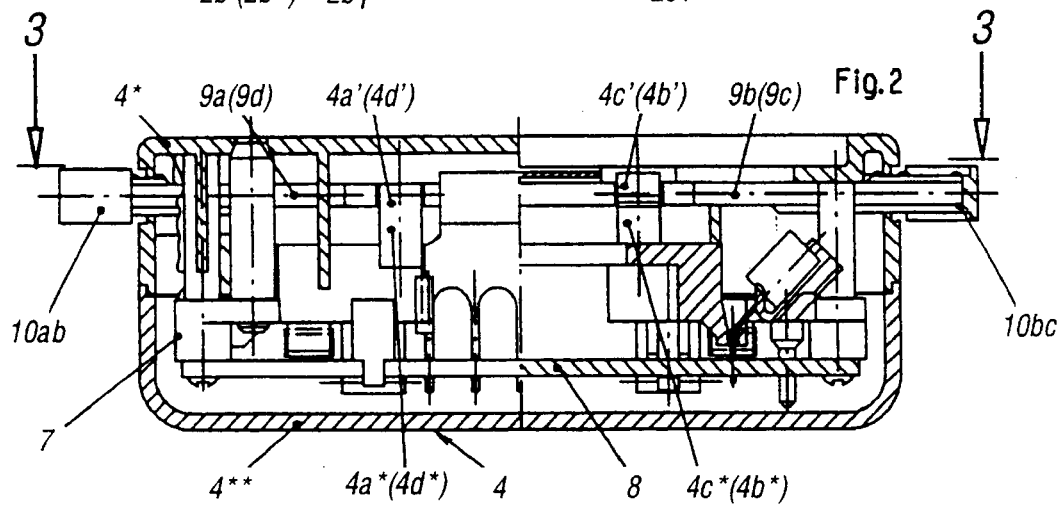
FIG. 2 is a cross-sectional view of the sensor device without the waveguide element taken along the line C-D of FIG. 3.

To secure components 4–8 to waveguide element 2 which is affixed to pane 1, four resilient U-shaped latching arms $4a^*$–$4d^*$ (FIGS. 2,3) are integrally formed in base part $4^*$ of housing 4. Latching cams or barbs (not specifically illustrated for the sake of simplicity) are provided at the free ends $4a'$–$4d'$ of the latching arms to engage latching recesses $2e^*$, $2e^{**}$, $2f^*$, and $2f^{**}$ of waveguide element 2. To ensure that the latching barbs cannot disengage their associated latching recesses, each has an associated slide-like locking element $9a$–$9d$ which is guided on base part $4^*$ and adjustable by way of an associated handle $10ad$ and $10bc$, respectively. The other (free) end regions $9a'$–$9d'$ of locking elements $9a$–$9d$ protrude into the space $4a_1$–$4d_1$ between the limbs of the U-shaped latching arms $4a^*$–$4d^*$ so as to prevent the free ends of the latching arms from being compressed which also prevents the latching cams from disengaging the recesses of waveguide element 2.

In order to compensate for tolerances of the components which are mutually engaged, the free end region of each locking element $9a$–$9d$ (associated with corresponding latching arms $4a^*$–$4d^*$) includes an aperture $9a^*$–$9d^*$ which provides resilience. End regions $9a''$–$9d''$, which lie opposite end regions $9a'$–$9d'$, are each provided with a common handle $10ad$ and $10bc$, respectively. End regions $9a''$–$9d''$ protrude outward through openings $4_1$ and $4_2$ at the two narrow sides of base part $4^*$. Dome-shaped protrusions $9a^{}$–$9d^{}$ are provided on opposing surfaces of end regions $9a''$–$9d''$ to maintain the locking elements in their locked or unlocked position within the housing. The protrusions cooperate with narrow ridges provided on base part $4^*$ of housing 4. The ridges are formed by regions of openings $4_1$ and $4_2$ which correspond to the protrusions. The handles and the openings provided on base part $4^*$ are designed in such a manner that the handles form a flush closure with housing 4 when in the locked position.

While the best mode for carrying out the invention has been described in detail, those familiar with the art to which this invention relates will recognize various alternative designs and embodiments for practicing the invention as defined by the following claims.

We claim:

1. An optoelectronic sensor for detecting precipitation on an outer surface of a transparent pane, the sensor including a waveguide element having a first surface for affixing to an inner surface of the transparent pane, the waveguide element including a plurality of recesses, at least two of which are on opposing sides of a waveguide element centerline, the sensor also including a beam transmitter for transmitting a beam to be received by a beam receiver, the sensor comprising:

a housing for surrounding the beam transmitter, the beam receiver, and the waveguide element, the housing including a plurality of resilient latching arms corresponding in number and location to the plurality of recesses, each latching arm having an arcuate portion and a barb adapted to engage a corresponding recess; and a plurality of locking elements corresponding in number to the plurality of latching arms, each locking element being guided by the housing parallel to the waveguide element between a locked and an unlocked position, the locked position being determined by positioning of the locking element into a space defined by the arcuate portion of a corresponding latching arm to prevent disengagement of the corresponding latching arm from its corresponding recess.

2. The optoelectronic sensor of claim 1 wherein the housing comprises:

a base portion for receiving the beam transmitter, the beam receiver, and the waveguide element; and a cover portion attachable to the base portion, wherein the base portion includes the latching arms and is adapted to guide the locking elements parallel to the waveguide element.

3. The optoelectronic sensor of claim 2 wherein the base portion and the cover portion are generally rectangular in shape having opposing smaller sides and larger sides and wherein the locking elements pass through the smaller sides of the base portion.

4. The optoelectronic sensor of claim 1 wherein the housing is generally rectangular in shape having opposing smaller sides and larger sides and wherein the locking elements pass through the smaller sides.

5. The optoelectronic sensor of claim 1 wherein at least two of the plurality of locking elements are connected by a common handle.

6. The optoelectronic sensor of claim 5 wherein the common handle is flush with the housing when the at least two locking elements are in the locked position.

7. The optoelectronic sensor of claim 1 wherein each locking element includes at least one latching element which cooperates with the housing to maintain the locking element in one of the locked and unlocked positions.

8. The optoelectronic sensor of claim 7 wherein the at least one latching element comprises a dome-shaped protrusion.

9. The optoelectronic sensor of claim 1 wherein at least two of the plurality of locking elements are connected by a common handle and wherein the common handle includes at least one latching element which cooperates with the housing to maintain the locking element in the locked and unlocked positions.

10. The optoelectronic sensor of claim 1 wherein the plurality of latching elements each includes a resilient portion overlapping the space defined by the latching arm when the latching element is in the locked position.

* * * * *